United States Patent
Kim et al.

(10) Patent No.: US 7,856,128 B2
(45) Date of Patent: Dec. 21, 2010

(54) METHOD OF COMPENSATING FOR DISTORTION CAUSED BY FINGERPRINT INPUT SENSORS OF HETEROGENEOUS FINGERPRINT RECOGNITION SYSTEMS

(75) Inventors: Hak Il Kim, Incheon (KR); Young Chan Han, Cheonan-si (KR)

(73) Assignee: Inha-Industry Partnership Institute, Inchon (KR)

( * ) Notice: Subject to any disclaimer, the term of this patent is extended or adjusted under 35 U.S.C. 154(b) by 1038 days.

(21) Appl. No.: 11/639,454

(22) Filed: Dec. 14, 2006

(65) Prior Publication Data

US 2007/0230751 A1    Oct. 4, 2007

(30) Foreign Application Priority Data

Mar. 28, 2006 (KR) .................. 10-2006-0028140

(51) Int. Cl.
*G06K 9/00* (2006.01)
(52) U.S. Cl. ........................ 382/124; 382/115
(58) Field of Classification Search ........... None
See application file for complete search history.

(56) References Cited

U.S. PATENT DOCUMENTS 4,944,021 A   7/1990 Hoshino et al.
6,266,433 B1  7/2001 Bolle et al.

OTHER PUBLICATIONS

Ross et al. ("Biometric Sensor Interoperability: A case study in fingerprints", LNCS vol. 3087, pp. 134-145, 2004).*
"A Fingerprint Verification System Based on Triangular Mathcing and Dynamic Time Warping", by Miklos et al., published by IEEE Transactions on Pattern Analaysis and Machine Intelligence, vol. 22, No. 11, Nov. 2000., pp. 1266-1276.
A Cross-Matching System for Various Types of Fingerprint Readers, BioAPI Specification, Version 1.1, Mar. 16, 2001.

* cited by examiner

*Primary Examiner*—Tom Y Lu
*Assistant Examiner*—Thomas A Conway
(74) *Attorney, Agent, or Firm*—Bachman & LaPointe P.C.

(57) ABSTRACT

A method of correcting distortion caused by fingerprint input sensors of heterogeneous fingerprint recognition systems. The method includes a first step of fabricating a measurement pattern for measuring resolutions of a fingerprint input sensor, a second step of measuring image resolutions of an image, acquired by the fingerprint input sensor, using the fabricated measurement pattern for predetermined locations and directions, a third step of designing control lines for compensating for the distortion caused by the fingerprint input sensor, based on the measured resolutions, a fourth step of obtaining average horizontal and vertical resolutions of the acquired image, a fifth step of modeling the control lines based on a ratio of the average horizontal resolution to the vertical average resolution, and a sixth step of compensating for the distortion of the acquired image based on results of the modeling.

6 Claims, 6 Drawing Sheets

Pattern Image

Sensor Image(0.5mm)

a. Basic Form of Control Line b. DPI Skewness (Start)

c. Control Line for Compensation (End)

METHOD OF COMPENSATING FOR DISTORTION CAUSED BY FINGERPRINT INPUT SENSORS OF HETEROGENEOUS FINGERPRINT RECOGNITION SYSTEMS

BACKGROUND OF THE INVENTION

1. Field of the Invention

The present invention relates generally to heterogeneous fingerprint recognition systems and, more particularly, to a method of compensating for distortion caused by fingerprint input sensors of heterogeneous fingerprint recognition systems, which is capable of compensating for distortion, caused by the heterogeneous fingerprint input sensors themselves, based on the measurement of the resolutions of a fingerprint input sensor using a Flat Artificial Finger Pattern (FAFP).

2. Description of the Related Art

In general, a fingerprint is an impression on a surface of the curves formed by the ridges on a fingertip, and fingerprints differ in shape from each other for individuals.

Accordingly, recently, fingerprint recognition has become very popular as a user authentication method for use with information devices and information services.

FIG. 1 is a block diagram of a typical fingerprint recognition system. The typical fingerprint recognition system is configured to authenticate a user in such a way that a minutia extraction module 20 extracts the minutiae of a fingerprint input through a fingerprint input sensor 10 and a matching module 30 compares the fingerprint with fingerprints previously registered in a database based on the extracted minutiae.

Meanwhile, since the current fingerprint input sensors of different manufacturers create different types of fingerprint images due to their different hardware characteristics (for example, with respect to resolution, image size, color depth or distortion rate), different functions for minutia extraction and fingerprint matching are performed to suit the characteristics of images sensed by the fingerprint input sensors of different manufacturers at the time of capturing the fingerprints.

Meanwhile, providers who provide application devices or services (the Internet or communications) using fingerprint recognition technology experience many difficulties when performing development work because the standards of commercialized fingerprint recognition devices are not harmonized with each other.

As a result, technologies for compatibility of fingerprint recognition between heterogeneous systems have been developed. To achieve compatibility of fingerprint recognition between heterogeneous systems, feature vectors insusceptible to differences in resolution and distortion between fingerprint images acquired by heterogeneous fingerprint input devices are required.

Among the technologies, the most widely known Ridge Count (RC) method uses the number of ridges existing between minutiae as feature information. This is a technology that is used in an Automatic Fingerprint Identification System (AFIS) to identify fingerprints in relation to a large-sized fingerprint database. Images input to the AFIS are chiefly images that are acquired by scanning fingerprints, impressed on paper using ink, at a high resolution using a planar scanner.

When a minutia is selected, NEC defines imaginary quadrants on the basis of the direction toward the minutia, defines a structure in which a minutia nearest to a central minutia selected from among the minutiae of each quadrant is selected, and uses the structure as a local structure for matching.

The algorithm is advantageous in that matching can be performed on a residual fingerprint, but is disadvantageous in that the structure sensitive to the direction of the minutia has low reproducibility in proportion to the number of minutiae.

In this algorithm, a coordinate system is converted using information about the direction of the minutia, which is the basis, whether a minutia adjacent to the base minutia exists in each quadrant is examined, and, if minutiae exist in all four quadrants, the ridges between the base minutia and the adjacent minutia are formed into a single group.

IBM connects two minutiae using an imaginary rectilinear line composed of five or three pixels, and information about the number of ridges is extracted by setting five or three pixels to a single segment and examining whether each segment is a ridge or valley.

Since the reliability of RC may be decreased in the case where the direction of a ridge sharply changes, information about the number of ridges is extracted only for the case where ridges are parallel with a specific direction, thereby increasing the reliability of extraction.

Information about the number of ridges is extracted by examining whether a rectilinear line connecting two minutiae is a ridge, and information about the number of ridges between a corresponding pair of minutiae is ignored in the process if a single ridge is not parallel.

Kovacs-Vajna measures the number of ridges by profiling a gray level based on a minutia located at the center of an image of extracted minutiae, and uses it for matching. Germain defines three minutiae as a triplet, and uses the number of ridges formed with respect to a formed triangle. Ratha defines other adjacent minutiae existing within a specific distance around a single minutia and a star-type structure, and uses the number of ridges existing between the minutiae for matching.

Lee searches for a click, which is certified to be the same click using a minutia-based algorithm, and expands a polygon into a concave polygonal shape. Features are extracted by expanding the polygon with respect to a minutia certified to be the same minutia and counting the number of ridges existing on a segment connecting minutiae.

This algorithm is disadvantageous in that an error occurs for a fingerprint image having different resolution and aspect ratio because the same click is searched for on a minutia basis, and the difference in distance between minutiae increases as the distance to an expansion base click increases.

As described above, attempts to extract only features robust to rotation, transition, extension and reduction, without considering the characteristics of fingerprint input sensors, and to perform fingerprint recognition between heterogeneous systems based on the extracted features have been made.

Furthermore, SC37 has performed the standardization of a biometric recognition data format so as to achieve compatibility between various biometric recognition technologies and systems. The International Labor Organization (ILO) constructed a system complying with the standard of a compatible format, and has already tested it. NIST organized a competition called Minutia Interoperability Exchange Test 2004 (MINEX04), and 15 organizations participated in the competition to determine the probability of using minutia data as information about fingerprints between heterogeneous fingerprint recognition systems, and underwent compatibility tests.

Regardless of the standardization of the data format, heterogeneous input devices have various Dot per Inch (DPI) resolutions and image sizes, therefore minutia-level matching causes a considerable reduction in recognition rate because the distortion characteristics of the sensors are different. In order to overcome the above problem, it is indispensable to perform a process of compensating for distortion, caused by a sensor, before a matching process.

SUMMARY OF THE INVENTION

Accordingly, the present invention has been made keeping in mind the above problems occurring in the prior art, and an object of the present invention is to provide a method of compensating for distortion caused by the fingerprint input sensors of heterogeneous fingerprint recognition systems, which is capable of compensating for distortion caused by fingerprint input sensors themselves in such a way as to measure the resolutions of the fingerprint input sensors using an FAFP and model the variation of control lines based on information about the measured resolutions.

In order to accomplish the above object, the present invention provides a method of correcting distortion caused by fingerprint input sensors of heterogeneous fingerprint recognition systems, the method including a first step of fabricating a measurement pattern for measuring resolutions of a fingerprint input sensor; a second step of measuring image resolutions of an image, acquired by the fingerprint input sensor, using the fabricated measurement pattern for predetermined locations and directions; a third step of designing control lines for compensating for the distortion caused by the fingerprint input sensor, based on the measured resolutions; a fourth step of obtaining average horizontal and vertical resolutions of the acquired image; a fifth step of modeling the control lines based on a ratio of the average horizontal resolution to the vertical average resolution; and a sixth step of compensating for the distortion of the acquired image based on results of the modeling.

The measurement pattern is an FAFP, and the width of the FAFP is 1.5 cm and the width of each pattern component is 0.5 mm.

The measurement of the resolutions of the image at the second step is performed for direction and location combinations of horizontal-upper, horizontal-median, horizontal-lower, vertical-left, vertical-median and vertical-right. The control lines are six in number in a start stage, and are respectively set at ¼, ½ and ¾ width locations in a width direction of the measurement pattern and at ¼, ½ and ¾ height locations in a height direction thereof. The modeling is performed in such a way that the average horizontal and vertical resolutions are modeled to have locations and lengths of the control lines in the start stages, the length of a control line for a resolution less than an average resolution is corrected to a longer length so that the resolution less than the average resolution is increased to the average resolution, and the length of a control line for a resolution higher than the average resolution is corrected to a shorter length.

The wherein weight for one control line is $$w = \left(\frac{l^c}{(a+d)}\right)^b,$$

when 'a' is a value significant for the control line (a significant value is a minute value that prevents a denominator from being zero and division by zero from being performed because the weight requires a division operation), 'b' is weight for a pixel adjacent to the control line, 'c' is weight for length of the control line and 'd' is distance between the control line and a conversion pixel, distance d is defined as $$d = \begin{cases} |v| & 0 < u < 1 \\ \|p - r\| & u < 0 \\ \|p - s\| & u > 1 \end{cases},$$

and, when 'i' is an index of a control line, 'w' is weight, 'p' is a correction target pixel, 'p'' is a corrected pixel, '$T_i(p)$' is a correction result based on an i-th control line, and '$T(p)$' is correction results in which the weights of all control lines have been considered, compensation is performed using the following equation:

$$p' = T(p) = p + \frac{\sum_{i=1}^{n} w_i \Delta p_i}{\sum_{i=1}^{n} w_i}, \Delta p_i = T_i(p) - p.$$

The correction of the distortion at the sixth step is performed based on a ratio of the average horizontal to the average vertical resolution.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE INVENTION

Since an image acquired by a fingerprint input sensor is subjected to distortion based on the type of fingerprint input sensor, the sensing method and process errors, the present invention measures the upper, lower, right, left and central resolution of the fingerprint input sensor using an FAFP, defines control lines based on respective pieces of information about the resolution, models the variation of the control lines, and corrects distortion caused by the fingerprint input sensor itself.

Figure 1:
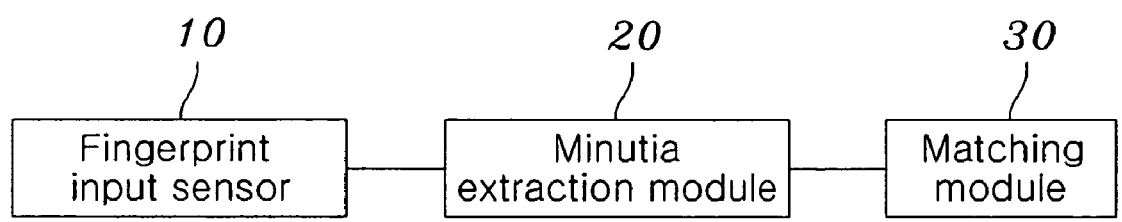
FIG. 1 is a block diagram of a typical fingerprint recognition system.
Figure 2A:
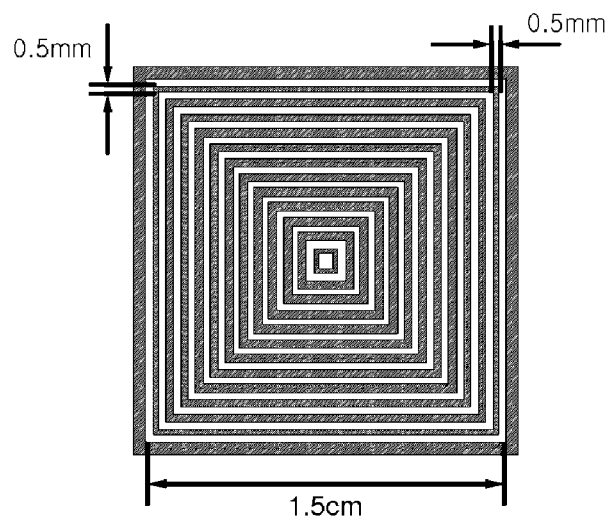
FIG. 2A is a diagram showing the specifications of an FAFP according to the present invention.

FIG. 2A shows the specifications of an FAFP that is used to measure the resolution of a fingerprint input sensor so as to compensate for distortion caused by the fingerprint input sensor. In the present invention, an FAFP is fabricated using a Printed Circuit Board (PCB)-shaped frame, and experimental values about the resolution of images acquired by a fingerprint input sensor are used.

The width of the overall pattern of the FAFP is 1.5 cm and the width of each pattern component is 0.5 mm. When a pattern the width of the overall pattern of which is 1.5 cm and the width of each pattern component is 0.5 mm is formed on a PCB substrate to form an FAFP, gelatin is poured onto the pattern and is then cured, and the gelatin is removed from the PCB substrate, an FAFP, shaped as described in FIG. 2A, is formed on the gelatin, and the FAFP is used in the present invention.

Figure 2B:
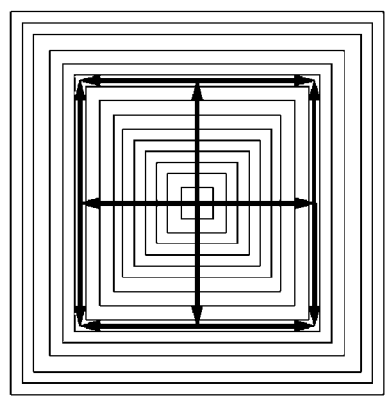
FIGS. 2B and 2C are diagrams showing a pattern image of FIG. 2A, and an image acquired using the fingerprint input sensor, respectively.
Figure 2C:
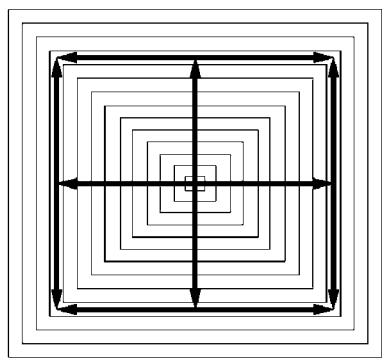

FIG. 2B shows a pattern image of FIG. 2A, and FIG. 2C shows an image acquired by the fingerprint input sensor.

Figure 3:
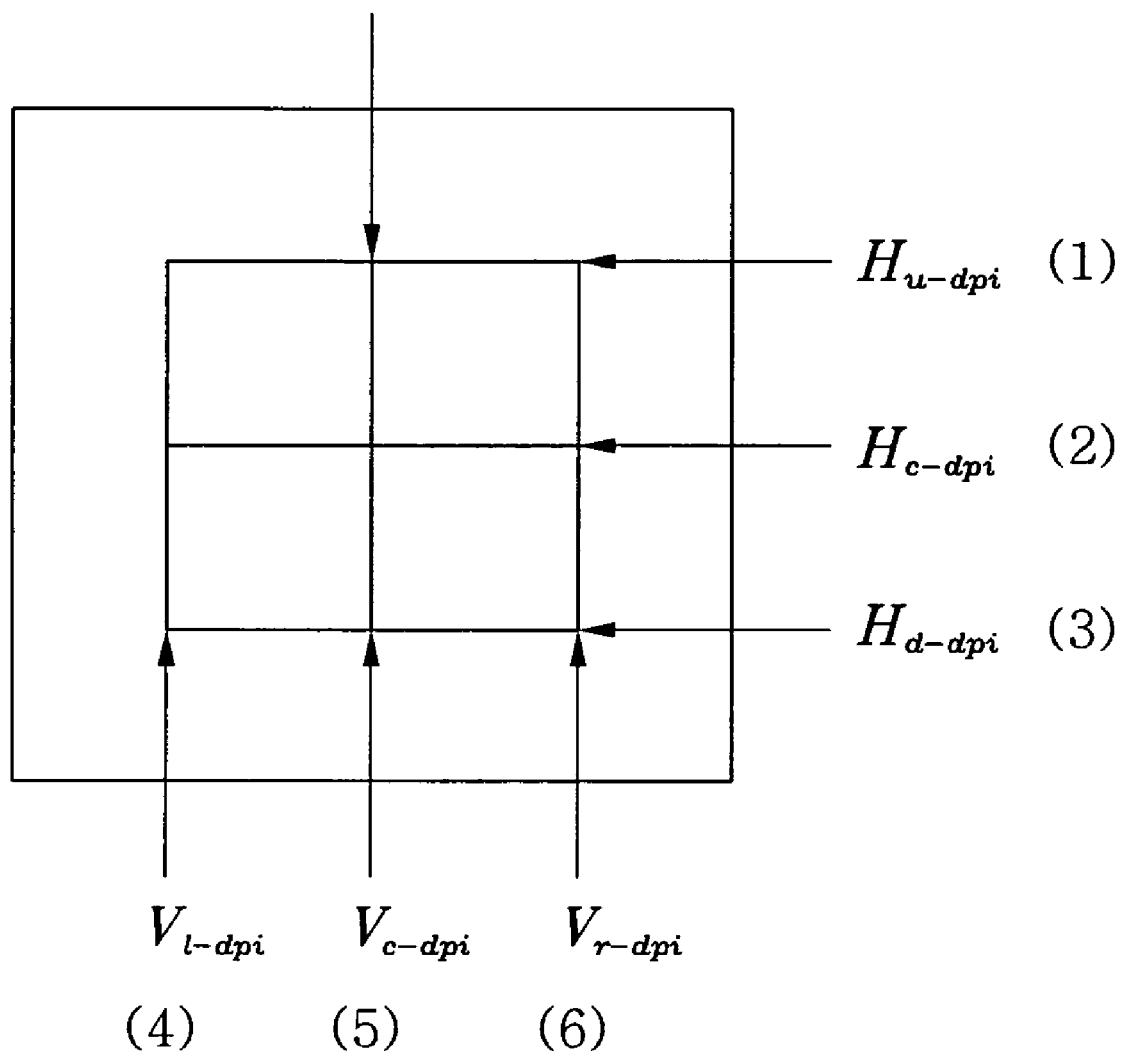
FIG. 3 is a diagram showing the directions and locations in and at which the resolutions of a fingerprint input sensor are measured according to the present invention.

FIG. 3 shows the directions and locations in and at which the resolutions of a fingerprint input sensor are measured according to the present invention. The image resolutions of an image acquired by the fingerprint input sensor are measured for direction and location combinations of horizontal-upper 1, horizontal-median 2, horizontal-lower 3, vertical-left 4, vertical-median 5 and vertical-right 6.

Figure 4A:
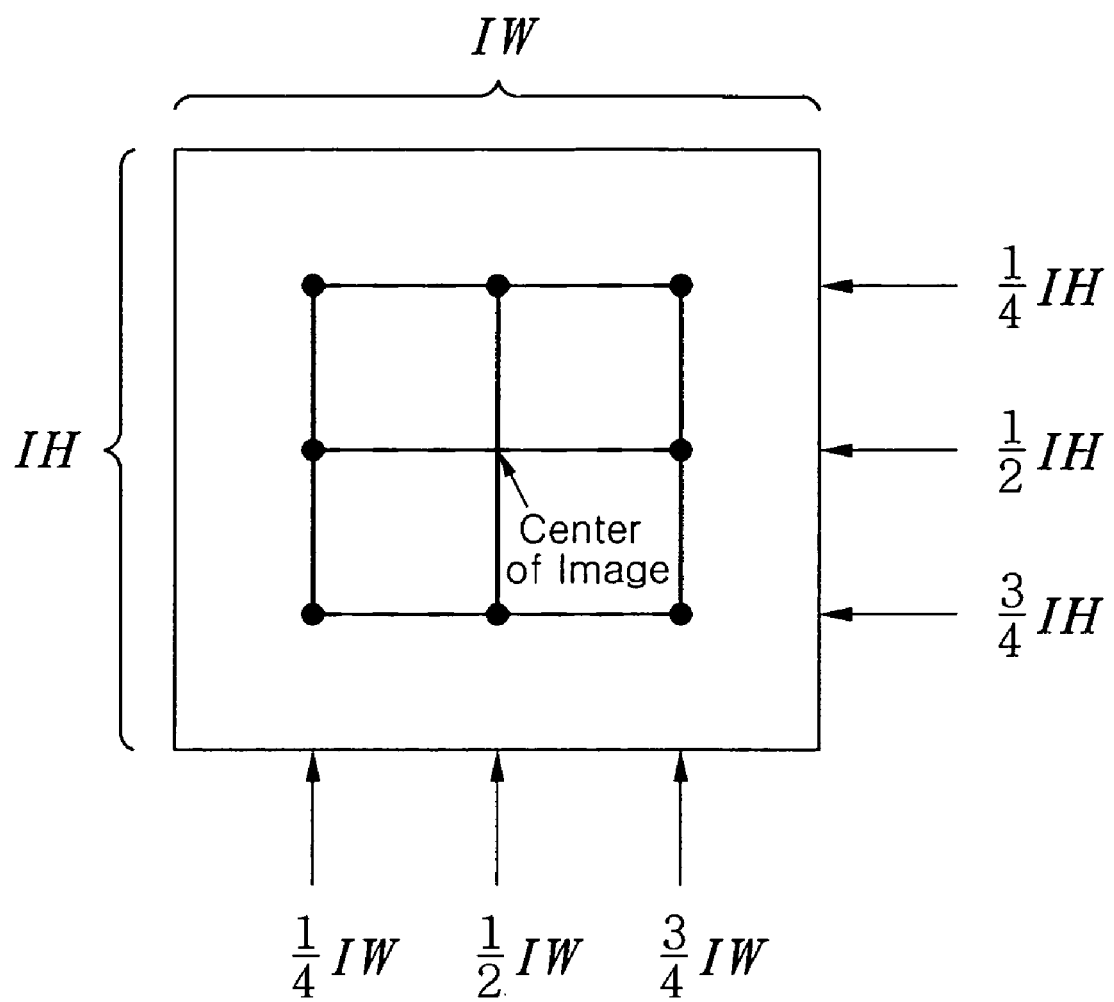
FIG. 4A is a diagram showing control lines for correcting distortion according to the present invention.

Six control lines for compensating for distortion caused by a fingerprint input sensor are also defined, and start control lines are respectively set at ¼, ½ width locations in the width direction of an FAFP and at ¼, ½ height locations in a height direction thereof (see FIG. 4A).

Figure 4B:
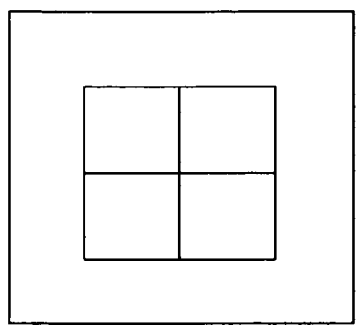
FIG. 4B is a diagram showing a distortion model and a corrected model using the control lines according to the present invention.
Figure 4B:
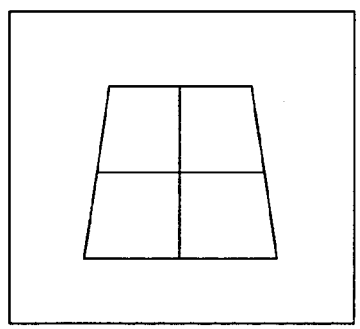
Figure 4B:
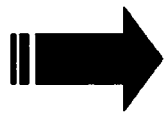
Figure 4B:
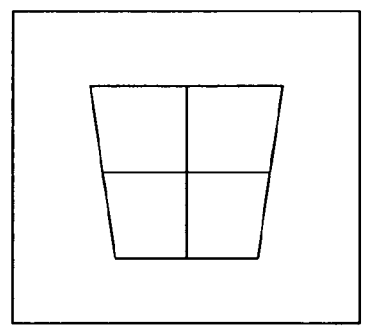

Modeling is performed to achieve compensation as described in FIG. 4b in such a way that average horizontal and vertical resolutions of an image are measured, the average resolutions are modeled to have the locations and lengths of the start control lines, the length of a control line for a resolution less than an average resolution is corrected to a longer length so that resolution less than the average resolution can be increased to the average resolution, and the length of a control line for a resolution higher than the average resolution is corrected to a shorter length.

Figure 5:
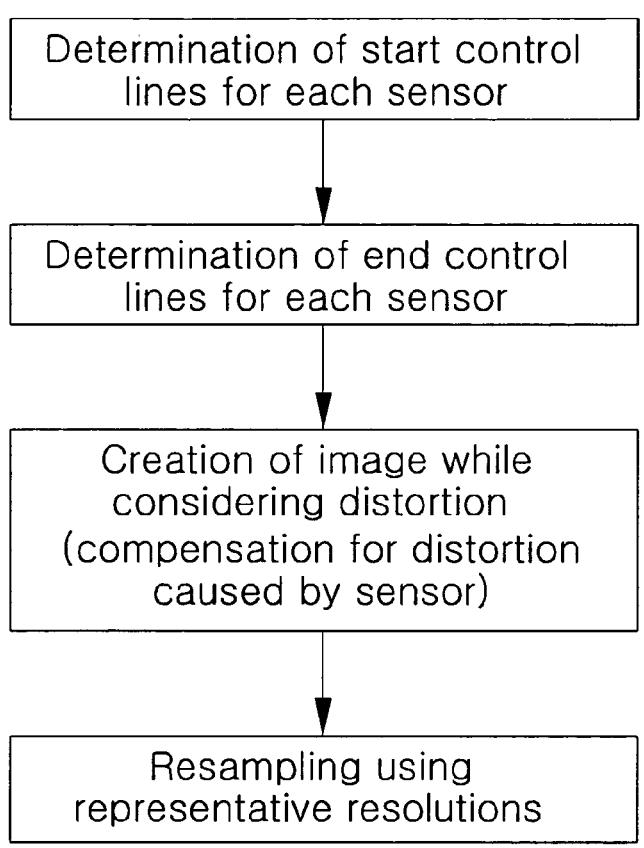
FIG. 5 is a flowchart showing a process of compensating for distortion, caused by a fingerprint input sensor, using control lines according to the present invention.
Figure 5:
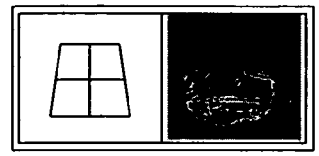
Figure 5:
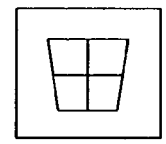
Figure 5:
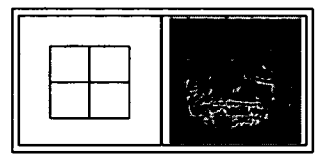
Figure 5:

The sequence of modeling and images corresponding to the sequence of modeling are illustrated in FIG. 5, and resolution conversion is performed using the representative resolutions (horizontal and vertical average resolutions) of a target fingerprint input sensor after correction.

Here, weight $$w = \left(\frac{l^c}{(a+d)}\right)^b$$

is assigned to a control line, and, when 'a' is a value significant for the control line (a significant value is a minute value that prevents a denominator from being zero and division by zero from being performed because weight requires a division operation), 'b' is the weight for a pixel adjacent to the control line, 'c' is the weight for the length of the control line, and 'd' is the distance between the control line and a conversion pixel, distance 'd' is defined as $$d = \begin{cases} |v| & 0 < u < 1 \\ \|p - r\| & u < 0 \\ \|p - s\| & u > 1 \end{cases}.$$

Modeling is performed such that the closer a pixel is to a control line, or the longer a control line is, the more the pixel is influenced by the control line. The equation for final correction is defined as follows:

$$p' = T(p) = p + \frac{\sum_{i=1}^{n} w_i \Delta p_i}{\sum_{i=1}^{n} w_i}, \Delta p_i = T_i(p) - p$$

where 'i' is the index of a control line, 'w' is the weight, 'p' is a correction target pixel, 'p' is a corrected pixel, '$T_i(p)$' is a correction result based on an i-th control line, and '$T(p)$' is correction results in which the weights of all control lines have been considered.

In the above-described present invention, when an image using the FAFP of FIG. 2 is acquired through the fingerprint input sensor, the fingerprint recognition system measures the upper, lower, right, left and central resolutions of an image acquired through the distortion compensation module, control lines are defined based on information about respective resolutions, the variation of the control lines is modeled, and distortion is compensated for by the fingerprint input sensor itself, thereby improving the recognition performance of the fingerprint recognition system.

As described above, since distortion, due to the type of fingerprint input sensor, the sensing method and process error, exists between heterogeneous fingerprint recognition systems, the present invention measures the upper, lower, right, left and central resolutions of a fingerprint input sensor using an FAFP, defines control lines based on information about respective resolutions, and models the variation of the control lines, therefore distortion caused by the fingerprint input sensor itself can be compensated for, thereby increasing the recognition performance of the fingerprint recognition system and improving the performance and reliability of recognition in matching between the heterogeneous fingerprint input sensors.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of correcting distortion caused by fingerprint input sensors of heterogeneous fingerprint recognition systems, the method comprising:
   a first step of fabricating a Flat Artificial Finger Pattern (FAFP) for measuring resolutions of a fingerprint input sensor;
   a second step of measuring image resolutions of an image, acquired by the fingerprint input sensor, using the fabricated Flat Artificial Finger Pattern (FAFP) for predetermined locations and directions;
   a third step of designing control lines for compensating for distortion caused by the fingerprint input sensor, based on the measured resolutions;
   a fourth step of obtaining average horizontal resolutions and average vertical resolutions of the acquired image;
   a fifth step of modeling the control lines based on a ratio of the average horizontal resolution to the average vertical resolution; and
   a sixth step of compensating for a distortion of the acquired image based on results of the modeling.

2. The method as set forth in claim 1, wherein a width of the FAFP is 1.5 cm and a width of each pattern component is 0.5 mm.

3. The method as set forth in claim 1, wherein the measurement of the resolutions of the image at the second step is performed for direction and location combinations of horizontal-upper, horizontal-median, horizontal-lower, vertical-left, vertical-median and vertical-right.

4. The method as set forth in claim 1, wherein the control lines are six in number in a start stage, and are respectively set at ¼, ½ and ¾ width locations in a width direction of the measurement pattern and at ¼, ½ and ¾ height locations in a height direction thereof.

5. The method as set forth in claim 4, wherein the modeling is performed in such a way that the average horizontal and vertical resolutions are modeled to have locations and lengths of the control lines in the start stages, a length of a control line for a resolution less than an average resolution is corrected to a longer length so that a resolution less than the average resolution is increased to the average resolution, and a length of a control line for a resolution higher than the average resolution is corrected to a shorter length so that a resolution higher than the average resolution is decreased to the average resolution.

6. The method as set forth in claim 1, wherein compensation is performed using the following equation:

$$p' = T(p) = p + \frac{\sum_{i=1}^{n} w_i \Delta p_i}{\sum_{i=1}^{n} w_i}, \Delta p_i = T_i(p) - p$$

where 'i' is an index of a control line, 'w' is weight, 'p' is a correction target pixel, 'p'' is a corrected pixel, '$T_i(p)$' is a correction result based on an i-th control line, and 'T(p)' is correction results in which the weights of all control lines have been considered.

* * * * *